US012285038B2

(12) United States Patent
Cheng

(10) Patent No.: US 12,285,038 B2
(45) Date of Patent: Apr. 29, 2025

(54) SOY MILK PRODUCING DEVICE

(71) Applicant: YUNG SOON LIH FOOD MACHINE CO., LTD., Taichung (TW)

(72) Inventor: Jui-Tai Cheng, Taichung (TW)

(73) Assignee: YUNG SOON LIH FOOD MACHINE CO., LTD., Taichung (TW)

( * ) Notice: Subject to any disclaimer, the term of this patent is extended or adjusted under 35 U.S.C. 154(b) by 893 days.

(21) Appl. No.: 17/462,447

(22) Filed: Aug. 31, 2021

(65) Prior Publication Data
US 2022/0079202 A1    Mar. 17, 2022

(30) Foreign Application Priority Data

Sep. 17, 2020  (TW) ................................. 109132174

(51) Int. Cl.
*A23N 1/02*     (2006.01)
*A23C 11/10*    (2021.01)
*A23L 11/65*    (2021.01)

(52) U.S. Cl.
CPC .............. *A23N 1/02* (2013.01); *A23C 11/103* (2013.01); *A23L 11/65* (2021.01); *A23V 2002/00* (2013.01)

(58) Field of Classification Search
CPC ......... A23N 1/02; A23C 11/103; A23L 11/65; A23V 2002/00
See application file for complete search history.

(56) References Cited

FOREIGN PATENT DOCUMENTS

| CN | 106417622 A1 | * | 2/2017 | ............. A23C 11/10 |
| CN | 107183198 A1 | * | 9/2017 | ............ A23C 11/103 |
| CN | 107771950 A1 | * | 3/2018 | ............. B02C 21/00 |
| CN | 208343168 U1 | * | 1/2019 | ............... B28C 7/00 |
| KR | 101732182 B1 | * | 5/2017 | ............. A23L 11/07 |

OTHER PUBLICATIONS

Machine translation of CN 106417622 A1 performed on Jul. 30, 2024, Zhou et al. (Year: 2017).*
Machine translation of CN 107183198 A1 performed on Jul. 30, 2024, Chen et al. (Year: 2017).*

(Continued)

*Primary Examiner* — Dana Ross
*Assistant Examiner* — Kevin Guanhua Wen
(74) *Attorney, Agent, or Firm* — MUNCY, GEISSLER, OLDS & LOWE, P.C.

(57) ABSTRACT

A soy milk producing device is provided, including: a suction apparatus, at least one feeder, at least one first grinding and filtering apparatus, a mixing barrel assembly and at least one second grinding and filtering apparatus. Each feeder has a first inlet for introducing fluid. Each second grinding and filtering apparatus is configured for grinding and filtering a mixed fluid of soy dregs and water to produce secondary soy fluid from the mixed barrel assembly; during a first soy milk production cycle, the fluid first inlet portion of at least one said soybean feeding machine is water; wherein the fluid in producing the first soy fluid is water; each of the at least one first grinding and filtering apparatus is further configured to grind and filter the soy beans with the secondary soy fluid to produce a thick soy fluid.

7 Claims, 10 Drawing Sheets

(56) References Cited

OTHER PUBLICATIONS

Machine translation of CN 107771950 A1 performed on Jul. 30, 2024, Xiong (Year: 2018).*
Machine translation of CN 208343168 U1 performed on Jul. 30, 2024, Ye (Year: 2019).*
Machine translation of KR 101732182 B1 performed on Jul. 30, 2024, Song (Year: 2017).*

* cited by examiner

SOY MILK PRODUCING DEVICE

BACKGROUND OF THE INVENTION

Field of the Invention

The present invention relates to a soy milk producing device.

Description of the Prior Art

In the conventional process of producing soy milk, soy beans are put into a grinder and are then ground and filtered to produce soy milk. After heated, the soy milk becomes drinkable, and the soy dregs are discarded. However, the concentration of the soy milk produced by the conventional process of producing soy milk is generally low due to insufficient and/or quantitative beans. To increase the concentration of soy milk, it can only proceed with increasing the amount of soy beans or reduce the amount of water, which increases the production cost.

The present invention is, therefore, arisen to obviate or at least mitigate the above-mentioned disadvantages.

SUMMARY OF THE INVENTION

The main object of the present invention is to provide a soy milk producing device which can produce soy milk with high thickness.

To achieve the above and other objects, a soy milk producing device is provided, including: a suction apparatus, configured to suck soy beans; at least one feeder, each of the at least one feeder being configured to receive the soy beans from the suction apparatus, each of the at least one feeder including a first inlet configured for a fluid to flow thereinto; at least one first grinding and filtering apparatus, each of the at least one first grinding and filtering apparatus being configured to receive the soy beans from the at least one feeder, each of the at least one first grinding and filtering apparatus including a dreg discharging portion, the dreg discharging portion including a water inlet configured for water to flow thereinto, each of the at least one first grinding and filtering apparatus being configured to grind and filter the soy beans with the fluid from the at least one feeder to produce a first soy fluid and dregs, the dreg discharging portion of each of the at least one first grinding and filtering apparatus being configured to discharge the dregs with the water; a mixing barrel assembly, configured to receive and mix the dregs and the water from the dreg discharging portion of the at least one first grinding and filtering apparatus; at least one second grinding and filtering apparatus, each of the at least one second grinding and filtering apparatus being configured to receive a mixed fluid of the dregs and the water from the mixing barrel assembly, each of the at least one second grinding and filtering apparatus being configured to grind and filter the mixed fluid to form a secondary soy fluid which is configured to be discharged from at least one outlet of the at least one second grinding and filtering apparatus; a collection barrel; and a pipeline, including a first section and a second section, the first section being connected between the collection barrel and the at least one outlet of the at least one second grinding and filtering apparatus, the second section being connected between the first inlet of the at least one feeder and the collection barrel, the collection barrel, the first section and the outlet of the at least one second grinding and filtering apparatus being in communication with each other to form a passageway, the pipeline and the collection barrel being configured to lead the secondary soy fluid from the at least one second grinding and filtering apparatus to the first inlet of the at least one feeder; wherein the fluid in producing the first soy fluid is water; each of the at least one first grinding and filtering apparatus is further configured to grind and filter the soy beans with the secondary soy fluid to produce a thick soy fluid; wherein the dreg discharging portion of the at least one first grinding and filtering apparatus and the mixing barrel assembly are enclosedly in communication with each other; wherein the mixing barrel assembly includes a barrel and a stirring mechanism, the barrel includes a via hole, the stirring mechanism is disposed in the barrel, the dreg discharging portion of the at least one first grinding and filtering apparatus further includes an enclosed guide body and a dreg discharging opening, the enclosed guide body includes a guiding section and a covering portion connected with the guiding section, the guiding section covers the dreg discharging opening, the covering portion covers the via hole, the guiding section, the dreg discharging opening, the covering portion and the barrel are enclosedly in communication with each other, the enclosed guide body includes the water inlet; wherein the soy milk producing device further includes a conduit, the conduit is connected with the water inlet, the conduit includes a discharging section, the discharging section is disposed within the guiding section, the discharging section includes at least one sprinkling hole.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
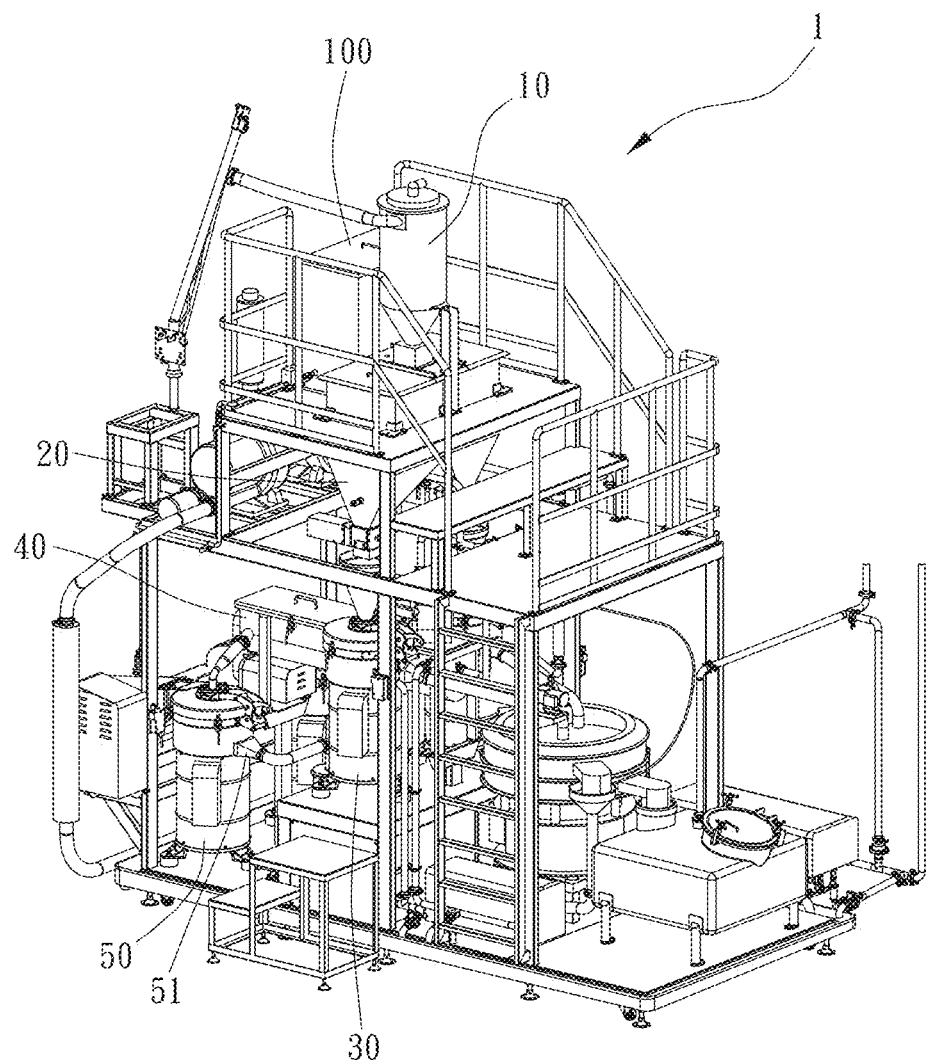
FIG. 1 is a stereogram of a preferable embodiment of the present invention.
Figure 2:
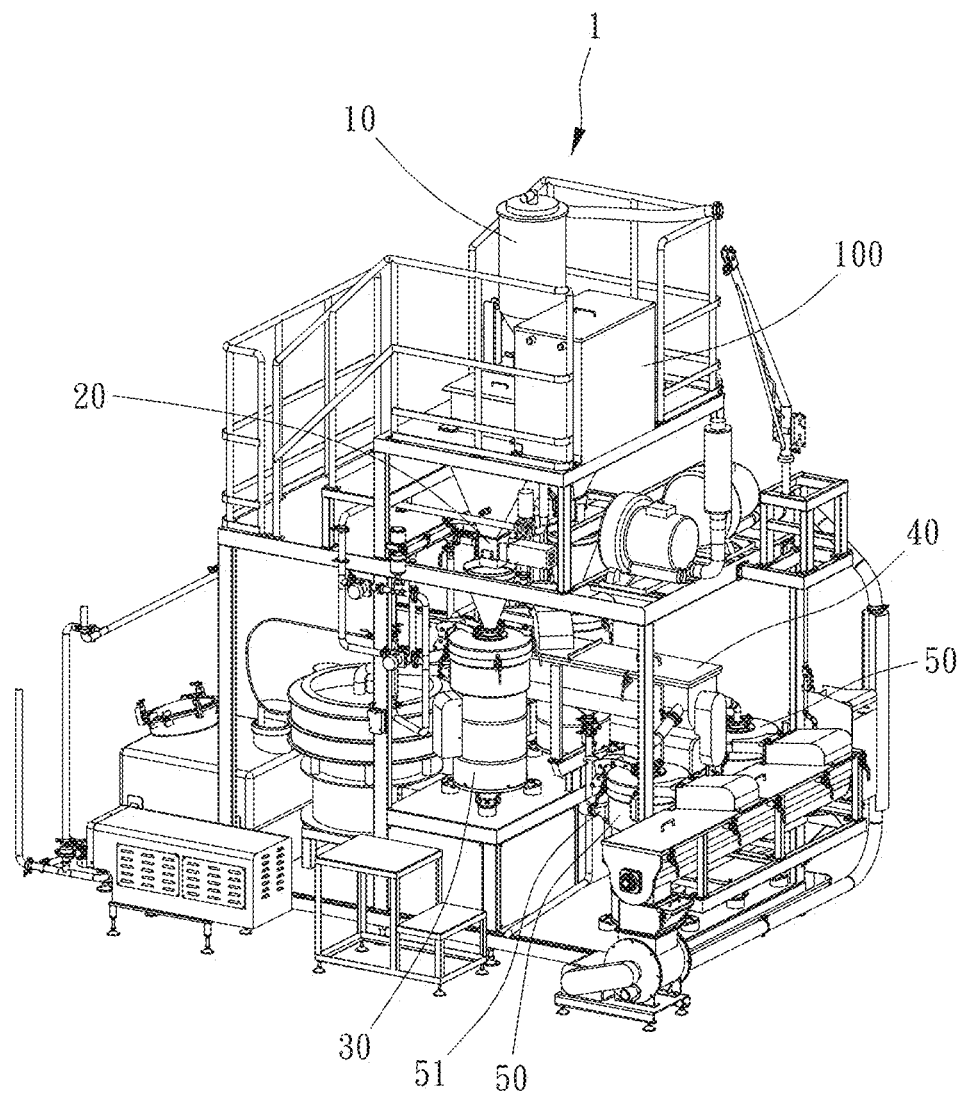
FIG. 2 is a second stereogram of a preferable embodiment of the present invention.
Figure 3:
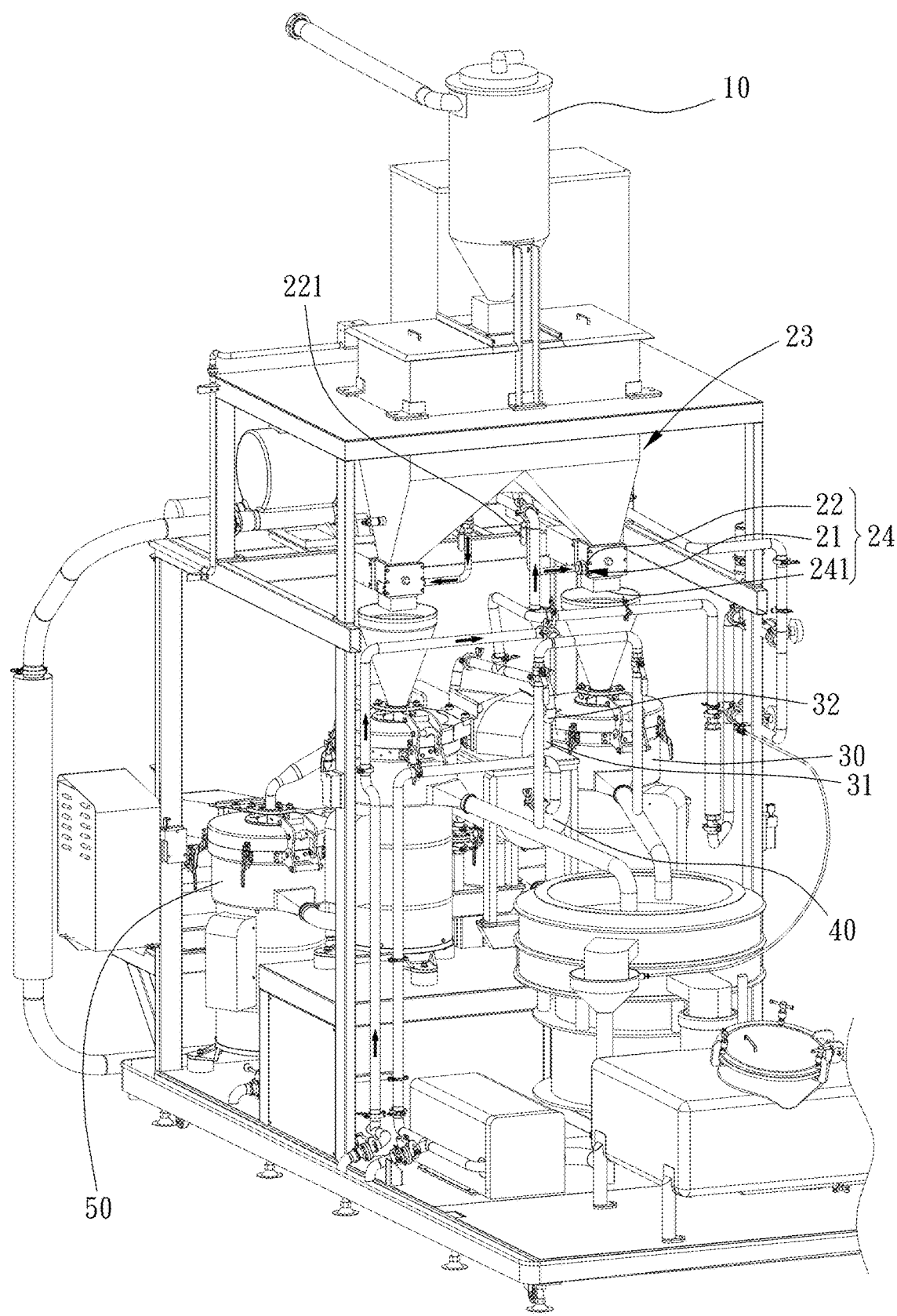
FIG. 3 is a partial enlargement of a preferable embodiment of the present invention.
Figure 4:
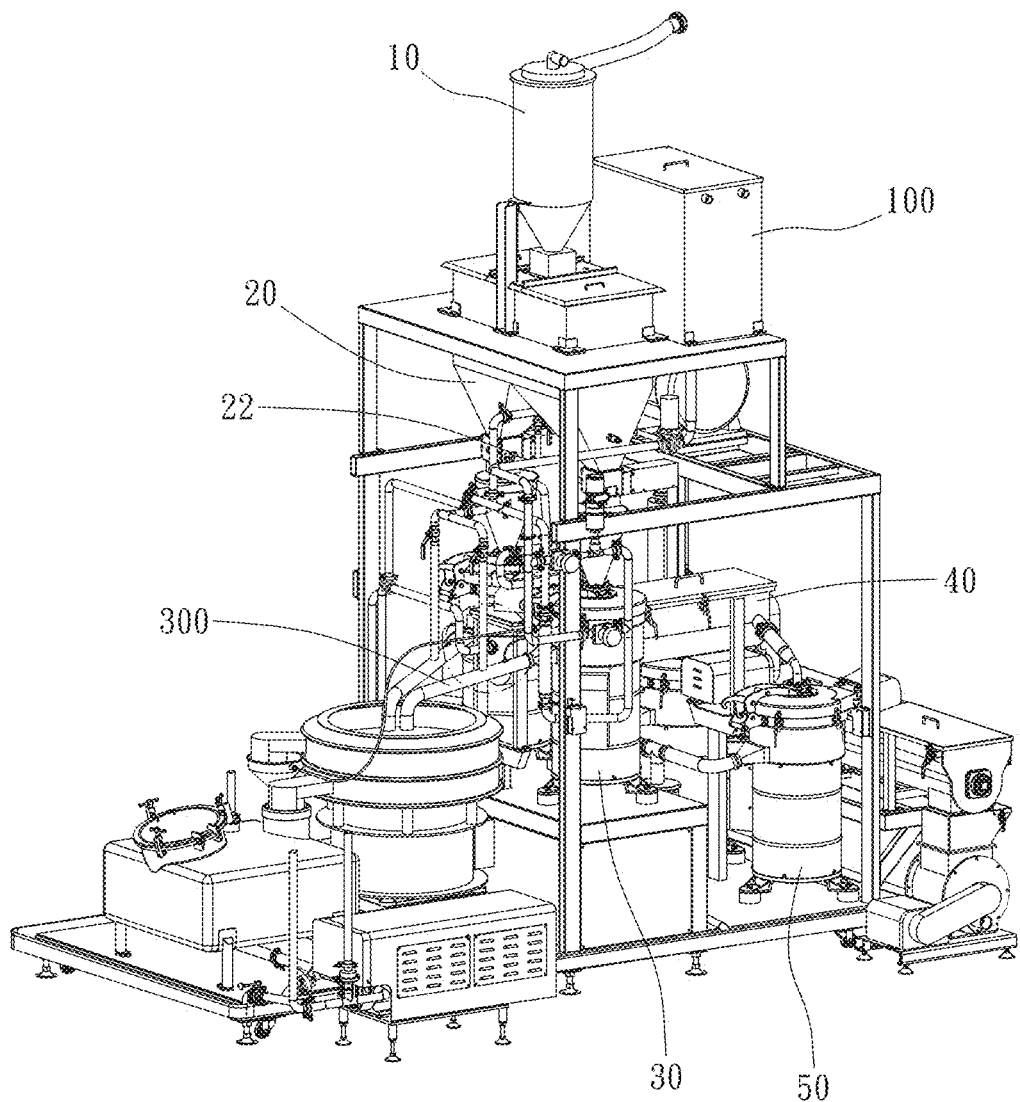
FIG. 4 is a third stereogram of a preferable embodiment of the present invention.
Figure 5:
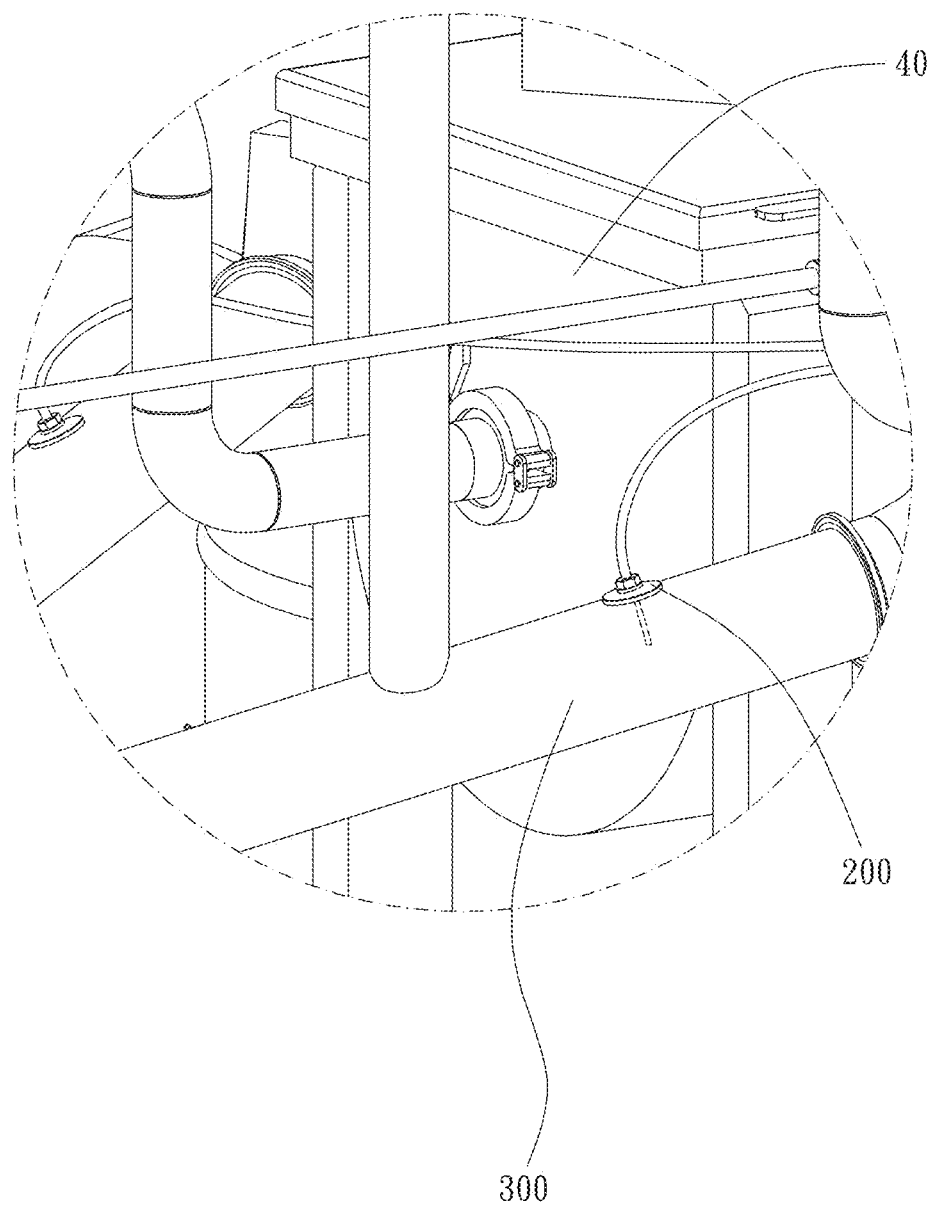
FIG. 5 is a partial enlargement of FIG. 4.
Figure 6:
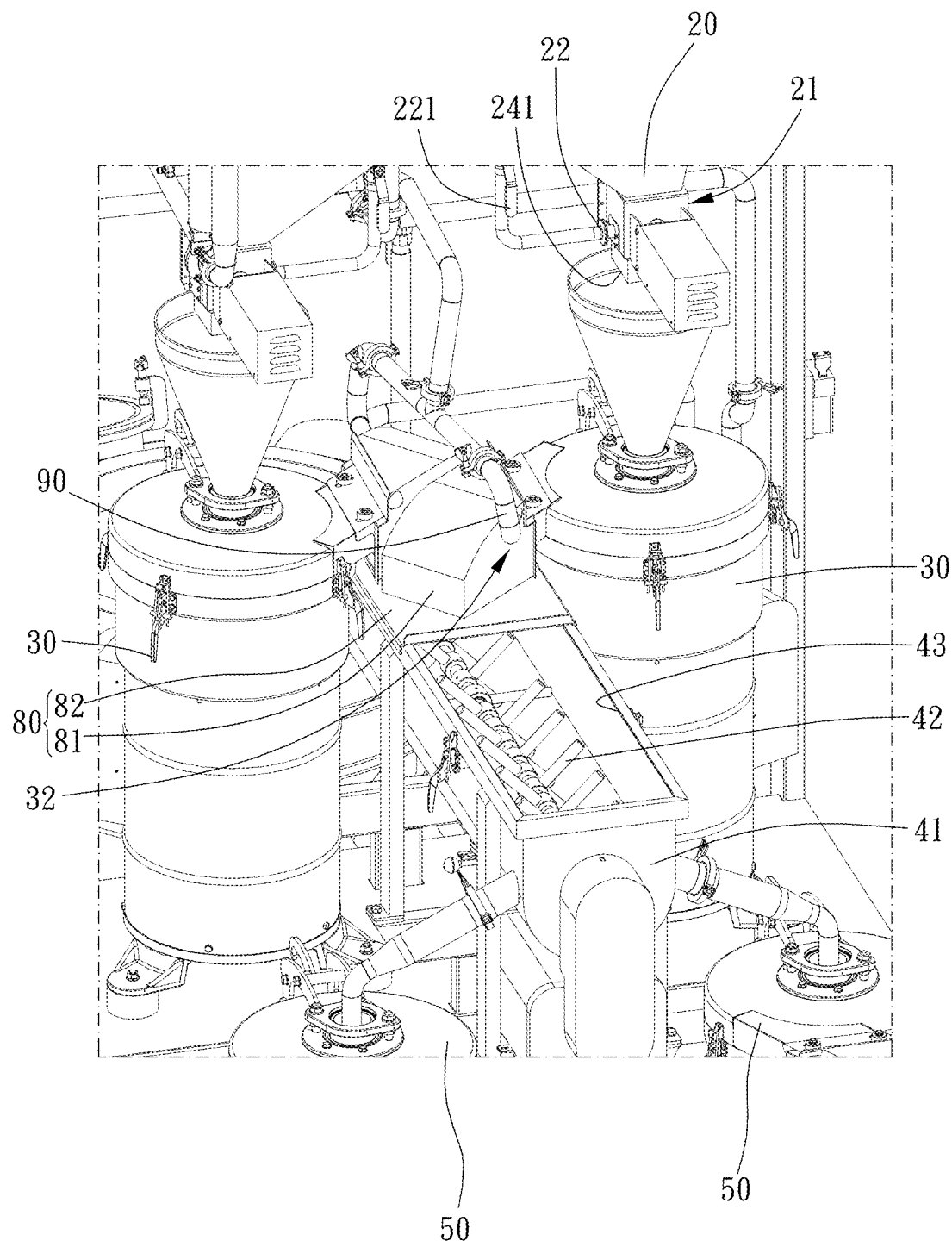
FIG. 6 is a second partial enlargement of a preferable embodiment of the present invention.
Figure 7:
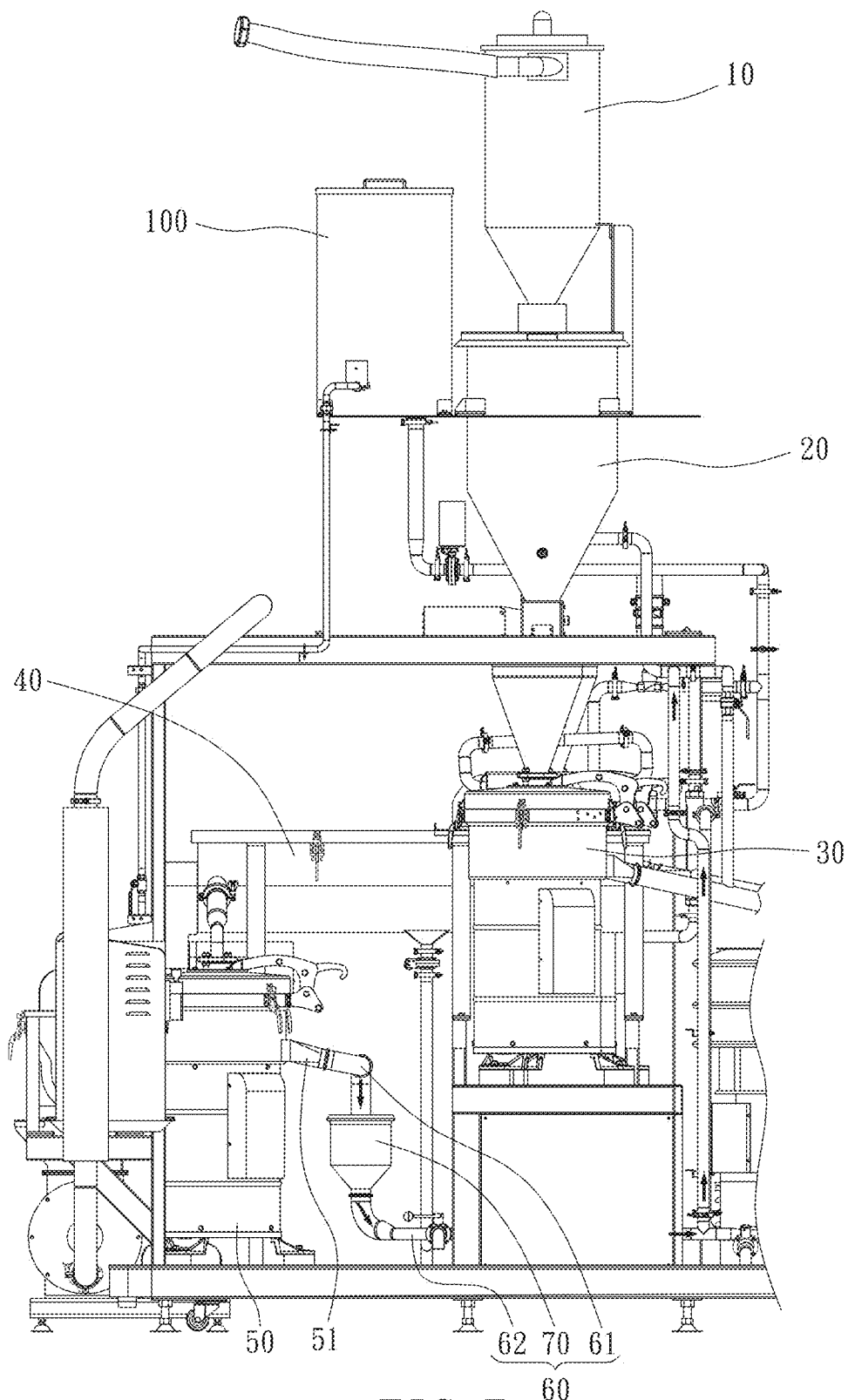
FIG. 7 is a partial side view of a preferable embodiment of the present invention.
Figure 8:
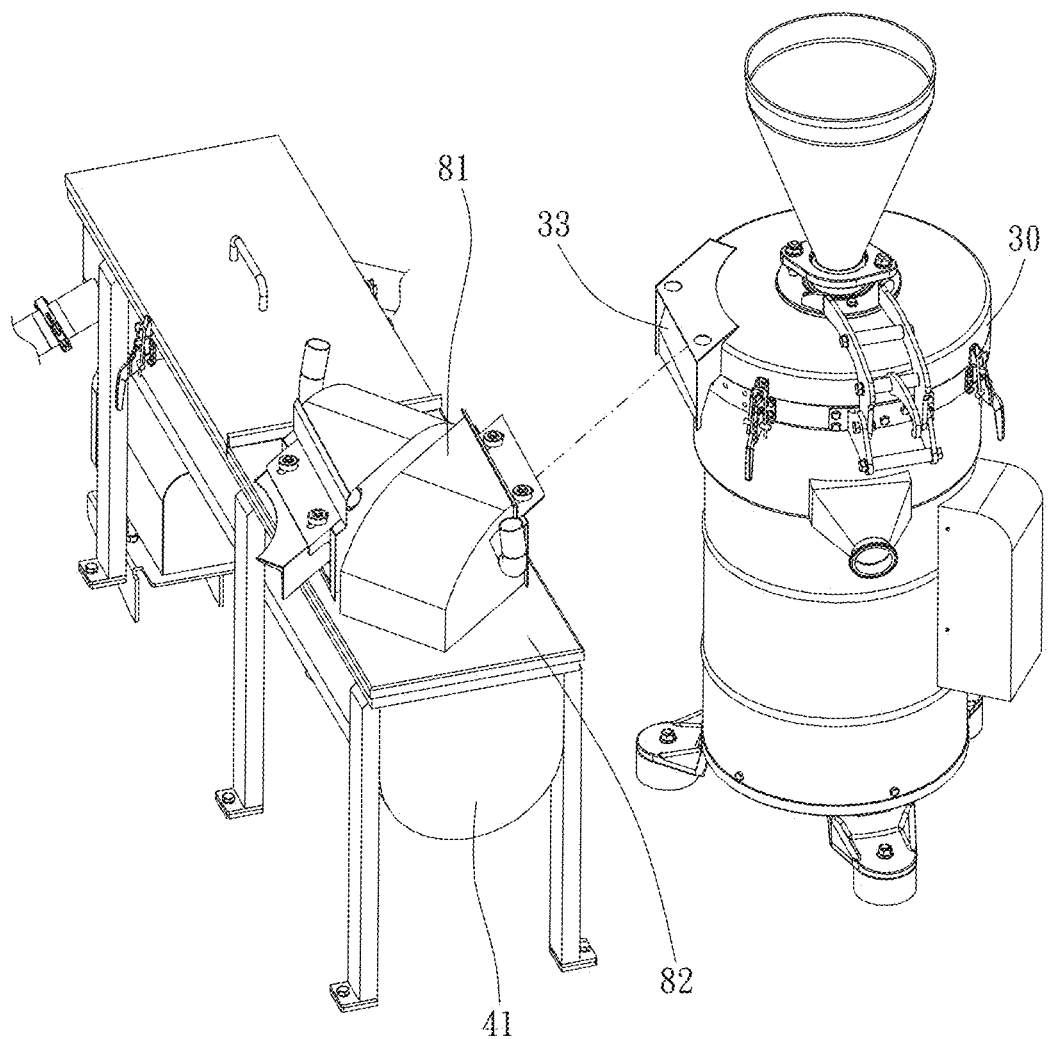
FIG. 8 is a partial breakdown drawing of a preferable embodiment of the present invention.
Figure 9:
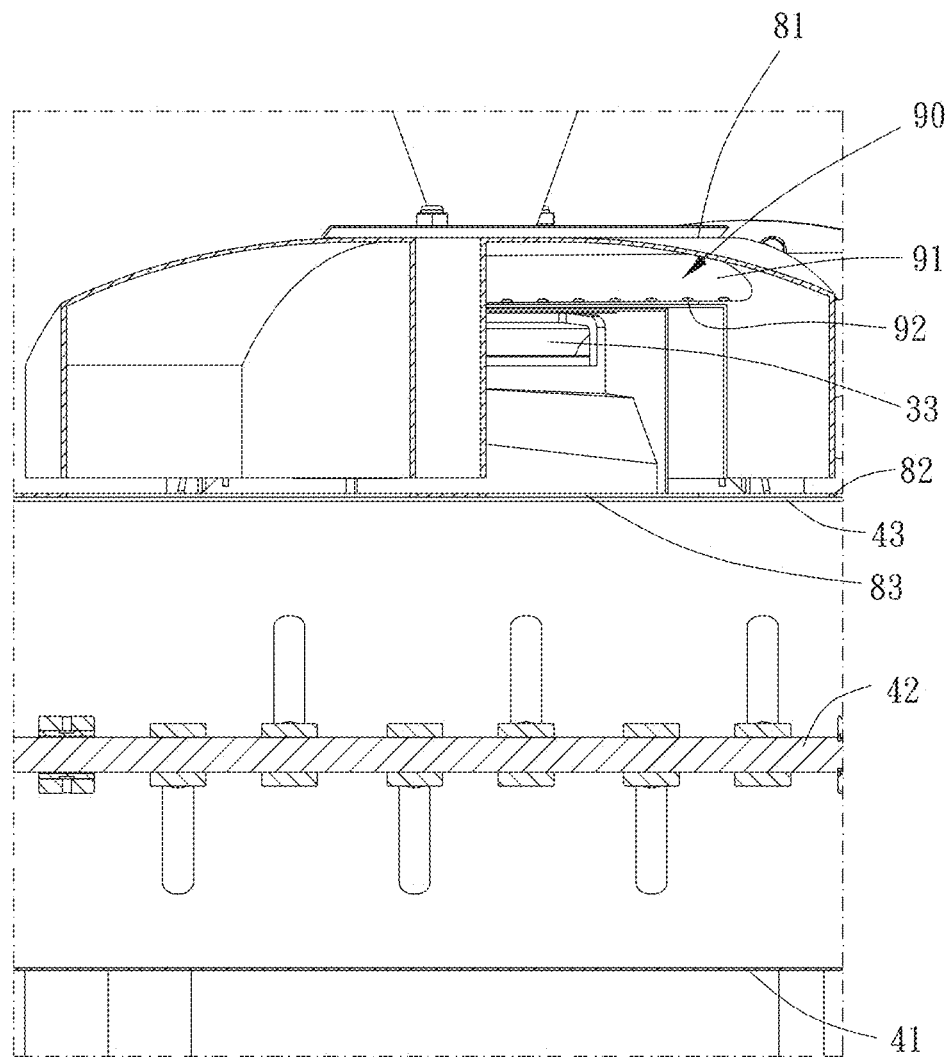
FIG. 9 is a partial cross-sectional view of a preferable embodiment of the present invention.
Figure 10:
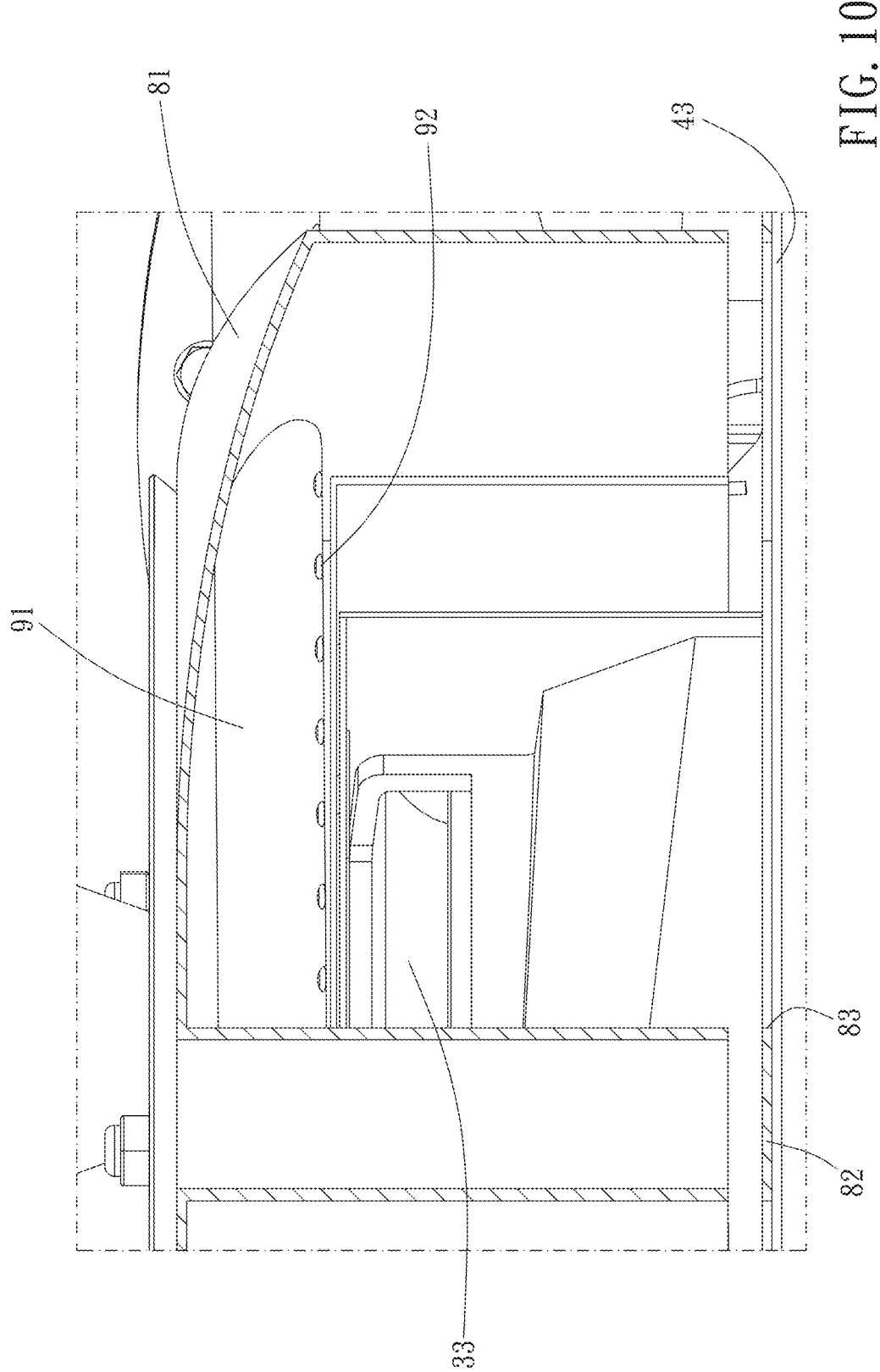
FIG. 10 is a partial enlargement of FIG. 9.

Please refer to FIGS. 1 to 10 for a preferable embodiment of the present invention. A soy milk producing device 1 of the present invention includes a suction apparatus 10, at least one feeder 20, at least one first grinding and filtering apparatus 30, a mixing barrel assembly 40, at least one second grinding and filtering apparatus 50, a pipeline 60 and a collection barrel 70.

The suction apparatus 10 is configured to suck soy beans. Each of the at least one feeder 20 is configured to receive the soy beans from the suction apparatus 10, and each of the at least one feeder 20 includes a first inlet 21 configured for a fluid to flow thereinto. Each of the at least one first grinding and filtering apparatus 30 configured to receive the soy beans from the at least one feeder 20, each of the at least one first grinding and filtering apparatus 30 includes a dreg discharging portion 31, the dreg discharging portion 31 includes a water inlet 32 configured for water to flow thereinto, each of the at least one first grinding and filtering apparatus 30 configured to grind and filter the soy beans with the fluid from the at least one feeder 20 to produce a first soy fluid and dregs, and the dreg discharging portion 31 of each of the at least one first grinding and filtering apparatus 30 is configured to discharge the dregs with the water. The mixing barrel assembly 40 is configured to receive and mix the dregs and the water from the dreg discharging portion 31 of the at least one first grinding and filtering apparatus 30. Each of the at least one second grinding and filtering apparatus 50 is configured to receive a mixed fluid of the dregs and the water from the mixing barrel assembly 40, and each of the at least one second grinding and filtering apparatus 50 is configured to grind and filter the mixed fluid to form a secondary soy fluid which is configured to be discharged from at least one outlet 51 of the at least one second grinding and filtering apparatus 50. The fluid in producing the first soy fluid is water. Each of the at least one first grinding and filtering apparatus 30 is further configured to grind and filter the soy beans with the secondary soy fluid to produce a thick soy fluid; that is, to producing the thick soy fluid, the secondary soy fluid which is thicker than water is introduced into the at least one feeder 20 via the first inlet 21 for obtaining thicker soy milk. Specifically, the secondary soy fluid is transported from each of the at least one second grinding and filtering apparatus 50 to the first inlet 21 of the at least one feeder 20 (as shown by the arrow in FIGS. 3 and 7) by a power source (such as a motor). Additionally, the dregs in the dreg discharging portion 31 of the at least one first grinding and filtering apparatus 30 can be dispersed by the water and is then transported to the mixing barrel assembly 40, thus being advantageous for mixing in the mixing barrel assembly 40. It is noted that to obtain thicker and thicker soy milk, at least two cycles (feeding beans with fluid-grinding and filtering-obtaining thicker fluid to be applied in next feeding beans with fluid) may be carried out.

The first inlet 21 includes an entering portion 22, the entering portion 22 is connected with the outlet 51 and configured for flowing of the water, and a control valve is used to control the water or the secondary soy fluid to come into the at least one feeder 20 through the entering portion 22. There may be a plurality of the entering portions provided for the water and the secondary soy fluid.

Each of the at least one feeder 20 includes a feeding end portion 23 and a discharging end portion 24, the feeding end portion 23 is configured to receive the soy beans from the suction apparatus 10, the discharging end portion 24 includes a discharging opening 241 and the first inlet 21, the discharging opening 241 is configured to discharge the soy beans to the at least one first grinding and filtering apparatus 30, and the discharging opening 241 is configured to discharge the soy beans and the fluid. Preferably, the first inlet 21 is closer to the feeding end portion 23 than the discharging opening 241 so that the soy beans can be coated with the fluid when pass through the at least one feeder 20.

The pipeline 60 includes a first section 61 and a second section 62, the first section 61 is connected between the collection barrel 70 and the at least one outlet 51 of the at least one second grinding and filtering apparatus 50, and the second section 62 is connected between the first inlet 21 of the at least one feeder 20 and the collection barrel 70. In this embodiment, the second section 62 is connected between the entering portion 22 and the collection barrel 70, and the collection barrel 70, the first section 61 and the at least one outlet 51 of the at least one second grinding and filtering apparatus 50 are in communication with each other to form a passageway. The pipeline 60 and the collection barrel 70 is configured to lead the secondary soy fluid from the at least one second grinding and filtering apparatus 50 to the first inlet 21 of the at least one feeder 20.

The dreg discharging portion 31 of the at least one first grinding and filtering apparatus 30 and the mixing barrel assembly 40 are enclosedly in communication with each other. Specifically, the mixing barrel assembly 40 includes a barrel 41 and a stirring mechanism 42, the barrel 41 includes a via hole 43, and the stirring mechanism 42 is disposed in the barrel 41. The dreg discharging portion 31 of the at least one first grinding and filtering apparatus 30 further includes an enclosed guide body 80 and a dreg discharging opening 33, the enclosed guide body 80 includes a guiding section 81 and a covering portion 82 connected with the guiding section 81. In this embodiment, the guiding section 81 is a cover body and covers the dreg discharging opening 33, and the covering portion 82 covers the via hole 43. The guiding section 81, the dreg discharging opening 33, the covering portion 82 and the barrel 41 are enclosedly in communication with each other so that the water, the fluid, the first and secondary soy fluid and the dregs can be prevented from being polluted and splashing thereof, wherein the enclosed guide body 80 includes the water inlet 32. The enclosed guide body 80 of the at least one first grinding and filtering apparatus 30 is detachably connected (screwed, for example) with the dreg discharging portion 31, which is advantageous for assembling/disassembling and cleaning. Preferably, the soy milk producing device 1 further includes a conduit 90, the conduit 90 is connected with the water inlet 32, the conduit 90 includes a discharging section 91, the discharging section 91 is disposed within the guiding section 81, and the discharging section 91 includes at least one sprinkling hole 92. In this embodiment, the covering portion 82 includes a communication hole 83, and the communication hole 83 is in communication with the barrel 41 and the enclosed guide body 80. The discharging section 91 includes a plurality of said sprinkling holes 92, the plurality of said sprinkling holes 92 correspond to the communication hole 83, so that the water can be evenly sprayed for a large range and evenly on the dregs.

The soy milk producing device 1 further includes a reservoir 100, the conduit 90 is connected between the reservoir 100 and the water inlet 32 of each of the at least one first grinding and filtering apparatus 30, for storing the water.

In this embodiment, the soy milk producing device 1 includes a plurality of said feeders 20, a plurality of said first grinding and filtering apparatuses 30 and a plurality of said second grinding and filtering apparatuses 50, which improves the productivity.

The soy milk producing device 1 further includes a concentration detector 200, the first soy fluid from each of the at least one first grinding and filtering apparatus 30 flows along a flowing path (such as a pipe 300), and the concentration detector 200 is located within the flowing path to detect a concentration of the first soy fluid. At least one of respective amounts of the soy beans and the fluid entering the at least one feeder 20 is adjustable according to the concentration of the first soy fluid detected by the concentration detector 200, thus ensuring quality and thickness of the soy milk.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A soy milk producing device, including:
a suction apparatus, configured to suck soy beans;
at least one feeder, each of the at least one feeder being configured to receive the soy beans from the suction apparatus, each of the at least one feeder including a first inlet configured for a fluid to flow thereinto;
at least one first grinding and filtering apparatus, each of the at least one first grinding and filtering apparatus being connected with the at least one feeder and configured to receive the soy beans from the at least one feeder, each of the at least one first grinding and filtering apparatus including a dreg discharging portion, the dreg discharging portion including a water inlet configured for water to flow thereinto, each of the at least one first grinding and filtering apparatus being configured to grind and filter the soy beans with the fluid from the at least one feeder to produce a first soy fluid and dregs, the dreg discharging portion of each of the at least one first grinding and filtering apparatus being configured to discharge the dregs with the water;
a mixing barrel assembly, configured to receive and mix the dregs and the water from the dreg discharging portion of the at least one first grinding and filtering apparatus; at least one second grinding and filtering apparatus, each of the at least one second grinding and filtering apparatus being configured to receive a mixed fluid of the dregs and the water from the mixing barrel assembly, each of the at least one second grinding and filtering apparatus being configured to grind and filter the mixed fluid to form a secondary soy fluid which is configured to be discharged from at least one outlet of the at least one second grinding and filtering apparatus;
a collection barrel; and
a pipeline, including a first section and a second section, the first section being connected between the collection barrel and the at least one outlet of the at least one second grinding and filtering apparatus, the second section being connected between the first inlet of the at least one feeder and the collection barrel, the collection barrel, the first section and the at least one outlet of the at least one second grinding and filtering apparatus being in communication with each other to form a passageway, the pipeline and the collection barrel being configured to lead the secondary soy fluid from the at least one second grinding and filtering apparatus to the first inlet of the at least one feeder;
wherein the fluid in producing the first soy fluid is water; each of the at least one first grinding and filtering apparatus is further configured to grind and filter the soy beans with the secondary soy fluid to produce a thick soy fluid;
wherein the dreg discharging portion of the at least one first grinding and filtering apparatus and the mixing barrel assembly are enclosedly in communication with each other;
wherein the mixing barrel assembly includes a barrel and a stirring mechanism, the barrel includes a via hole, the stirring mechanism is disposed in the barrel, the dreg discharging portion of the at least one first grinding and filtering apparatus further includes an enclosed guide body and a dreg discharging opening, the enclosed guide body includes a guiding section and a covering portion connected with the guiding section, the guiding section covers the dreg discharging opening, the covering portion covers the via hole, the guiding section, the dreg discharging opening, the covering portion and the barrel are enclosedly in communication with each other, the enclosed guide body includes the water inlet;
wherein the soy milk producing device further includes a conduit, the conduit is connected with the water inlet, the conduit includes a discharging section, the discharging section is disposed within the guiding section, the discharging section includes at least one sprinkling hole;
wherein the first inlet of each of the at least one feeder is connected with the at least one outlet of the at least one second grinding and filtering apparatus, and a control valve is disposed within the pipeline and used to control the water or the secondary soy fluid to come into the at least one feeder.

2. The soy milk producing device of claim 1, wherein each of the at least one feeder includes a feeding end portion and a discharging end portion, the feeding end portion is configured to receive the soy beans from the suction apparatus, the discharging end portion includes a discharging opening and the first inlet, the discharging opening is configured to discharge the soy beans to the at least one first grinding and filtering apparatus, and the discharging opening is configured to discharge the soy beans and the fluid.

3. The soy milk producing device of claim 1, wherein the enclosed guide body of the at least one first grinding and filtering apparatus is detachably connected to the dreg discharging portion of the at least one first grinding and filtering apparatus.

4. The soy milk producing device of claim 1, wherein the covering portion includes a communication hole, the communication hole is in communication with the barrel and the enclosed guide body, the discharging section includes a plurality of said sprinkling holes, the plurality of said sprinkling holes correspond to the communication hole; each of the at least one feeder includes a feeding end portion and a discharging end portion, the feeding end portion is configured to receive the soy beans from the suction apparatus, the discharging end portion includes a discharging opening and the first inlet, the discharging opening is configured to discharge the soy beans to the at least one first grinding and filtering apparatus, the discharging opening is configured to discharge the soy beans and the fluid; the first inlet is closer to the feeding end portion than the discharging opening; the first inlet includes an entering portion, the second section is connected between the entering portion and the collection barrel, the entering portion is configured for flowing of the water; the secondary soy fluid from the at least one second grinding and filtering apparatus is transported to the first inlet of the at least one feeder; the soy milk producing device further includes a reservoir, the conduit is connected between the reservoir and the water inlet of each of the at least one first grinding and filtering apparatus; the enclosed guide body of the at least one first grinding and filtering apparatus is detachably connected to the dreg discharging portion of the at least one first grinding and filtering apparatus.

5. The soy milk producing device of claim 1, wherein the soy milk producing device includes a plurality of said feeders, a plurality of said first grinding and filtering apparatuses and a plurality of said second grinding and filtering apparatuses.

6. The soy milk producing device of claim 1, further including a concentration detector, wherein the first soy fluid from each of the at least one first grinding and filtering apparatus flows along a flowing path, and the concentration detector is located within the flowing path to detect a concentration of the first soy fluid.

7. The soy milk producing device of claim 6, wherein, at least one of respective amounts of the soy beans and the fluid entering the at least one feeder is adjustable according to the concentration of the first soy fluid detected by the concentration detector.

\* \* \* \* \*